United States Patent [19]

Schalberger

[11] Patent Number: 4,738,577

[45] Date of Patent: Apr. 19, 1988

[54] FURNACE FOR THE HEAT TREATMENT OF WORK PIECES

[75] Inventor: Wolfgang Schalberger, Dortmund, Fed. Rep. of Germany

[73] Assignee: Ruhrgas Aktiengesellschaft, Essen, Fed. Rep. of Germany

[21] Appl. No.: 865,342

[22] Filed: May 21, 1986

[30] Foreign Application Priority Data

May 22, 1985 [DE] Fed. Rep. of Germany ....... 3518347

[51] Int. Cl.[4] ........................ B65G 25/00; B66C 17/08

[52] U.S. Cl. ..................................... 414/160; 198/773; 198/778

[58] Field of Search ........................ 414/156, 160, 254; 198/773, 778

[56] References Cited

U.S. PATENT DOCUMENTS

| | | | |
|---|---|---|---|
| 2,530,595 | 11/1950 | Blaha | 414/156 X |
| 3,295,666 | 1/1967 | Kay et al. | 198/778 X |
| 3,343,656 | 9/1967 | Koepke et al. | 198/773 |
| 3,497,087 | 2/1970 | Vita | 414/254 X |

*Primary Examiner*—David H. Corbin

*Attorney, Agent, or Firm*—Fay, Sharpe, Beall, Fagan, Minnich & McKee

[57] ABSTRACT

A helical conveyor system comprising two groups of bar-shaped support elements are attached to two mounting means in the heat treatment chamber of a furnace. The mounting means and the associated support elements are mobile relative to each other both in the vertical direction and in the direction of the circumference of the conveyor system for moving the work pieces along the conveyor system. The design, assembly and operation of the conveyor system and the mode of conveyor system operation are simplified by the provision of a vertical support shaft penetrating the furnace roof for the first mounting means. The support shaft holds at least one sleeve firmly connected with the second mounting means allowing the support shaft and the sleeve to be rotated relative to each other around and to be moved relative to each other along a central axis, the shaft and the sleeve guiding each other.

23 Claims, 2 Drawing Sheets

FURNACE FOR THE HEAT TREATMENT OF WORK PIECES

BACKGROUND OF THE INVENTION

1. Field of the Invention

The present invention relates to a furnace for the heat treatment of work pieces of the kind in which at least two groups of bar-shaped support elements are attached to two mounting means in a furnace chamber with a substantially circular and preferably helical conveyor system and in which said two mounting means and the associated support elements are mobile both in a vertical direction and in the direction of the circumference of said conveyor system so as to move work pieces along said conveyor system.

2. Prior Art

A furnace of said kind is known from PCT application No. WO 84/02390. A furnace of said kind offers substantial design and operational advantages over common rotary-hearth furnaces. One of said advantages of furnaces of said kind is the particular fitness of furnaces of said kind for nitriding and other heat treatment operations of a similar kind, since the dwell time of the work pieces in each temperature zone of the furnace may be varied easily, in particular if the conveyor system is of a helical design and the thermal insulation between the furnace inlet and the furnace exit poses no problem. Further, maximum use is made of the size of the furnace chamber increasing furnace throughput for chambers of the same size. The energy consumption for heat treatment is particularly low by comparison with a conventional furnace.

SUMMARY OF THE INVENTION

It is an object of the present invention to provide for a conveyor system of a simple design for furnaces of the kind described hereinabove, said conveyor system being designed for easy installation and adjustment and for reliable operation allowing the exact movement of parts of said conveyor system moving relative to each other.

According to the present invention, the first mounting means comprises at least one vertical support shaft penetrating one furnace wall, said vertical support shaft holding at least one sleeve firmly connected with said second mounting means so as to allow the rotation around and the movement along a central axis of said shaft and said sleeve, said shaft and said sleeve guiding each other. If said mounting means providing for the movement of work pieces along said circular conveyor system guide each other and are aligned as proposed by the present invention, the paths of the bar-shaped support elements may be adjusted easily and exactly when said conveyor system is installed and the interacting support elements of said two mounting means may be aligned easily in the desired positions. Said positions to which said support elements are adjusted relative to each other and the movement of said support elements will remain exactly the same during long periods of operation. The mutual centering and guidance of said two mounting means by means of the combination of a shaft and a sleeve allows independent relative movements of said mounting means both in the axial and in the circumferential direction.

In a preferred embodiment of the present invention the first mounting means is particularly compact, maintaining the guiding function of said support shaft and still allowing easy assembly and installation of said support elements, if two flanges spaced at a vertical distance along said support shaft are attached to said support shaft, support bars with parallel axes being held by said two flanges and support elements projecting substantially radially outward being attached to said support bars so as not to allow any rotation. Said support bars with parallel axes are preferably arranged individually or as pairs concentrically around said central axis at an approximately even angular spacing.

According to another aspect of the present invention another low-cost and compact embodiment equally allowing easy assembly and installation is characterized by the support elements associated with said second mounting means being arranged at an approximately even angular spacing on the circumference of another circle around said central axis projecting substantially radially inward from said circle and being connected with at least one ring attached to said sleeve coaxially with said central axis. In a preferred embodiment, a second sleeve is mounted on said support shaft with a vertical distance from said first sleeve, said second sleeve being rotatable around and mobile along said support shaft and firmly connected with a second ring and the support elements are firmly connected with support bars with parallel axes so as not to rotate about said bars, said support bars being held by said two rings aligned with respect to each other. In the case of the embodiment of the present invention described in the preceeding sentence, the two coaxial rings and the support bars held by said two rings form a cage-type structure surrounding said first mounting means and the support elements held by said first mounting means, the two sleeves of said second mounting means being mobile relative to the inner shaft-mounted flanges by a predetermined axial lift.

According to another aspect of the present invention, said two mounting means may be installed and removed with particular ease if said second mounting means is suspended from a furnace cover into said furnace chamber. Said furnace cover may represent the wall of the furnace penetrated by the vertical support shaft. As said cover is removed from said furnace said two mounting means may be lifted out of said furnace and may be reinstalled particularly easily for instance following an inspection or any repair which may be necessary.

In an preferred embodiment of the present invention said second mounting means is firmly held in place inside the furnace whereas said support shaft for the movements of said two mounting means relative to each other may be moved in the axial direction and may be rotated and may be coupled to driving means for lifting and rotation.

According to another aspect of the present invention, installation and the adjustment of the relative positions of interacting support elements may be simplified further by the provision of a footing for each support element for attachment to one of the bars of a pair of bars. For a helical conveyor system, several support elements are attached to a bar or a pair of bars with vertical distances relative to each other and said distance is maintained by at least one preferably tube-shaped or twin-tube-shaped spacer attached to said bar or pair of bars. The distances between said support elements may thence be fixed exactly by selecting spacer means of appropriate lengths, thereby substantially reducing adjustment work during the installation of the mounting means mainly by comparison with conventional weld jointing and facilitating a readjustment of the distances between said support elements to accommodate work pieces of different sizes.

BRIEF DESCRIPTION OF THE DRAWINGS

The present invention will now be described with the help of preferred embodiment illustrated in the accompanying drawings.

DETAILED DESCRIPTION OF THE INVENTION

Figure 1:
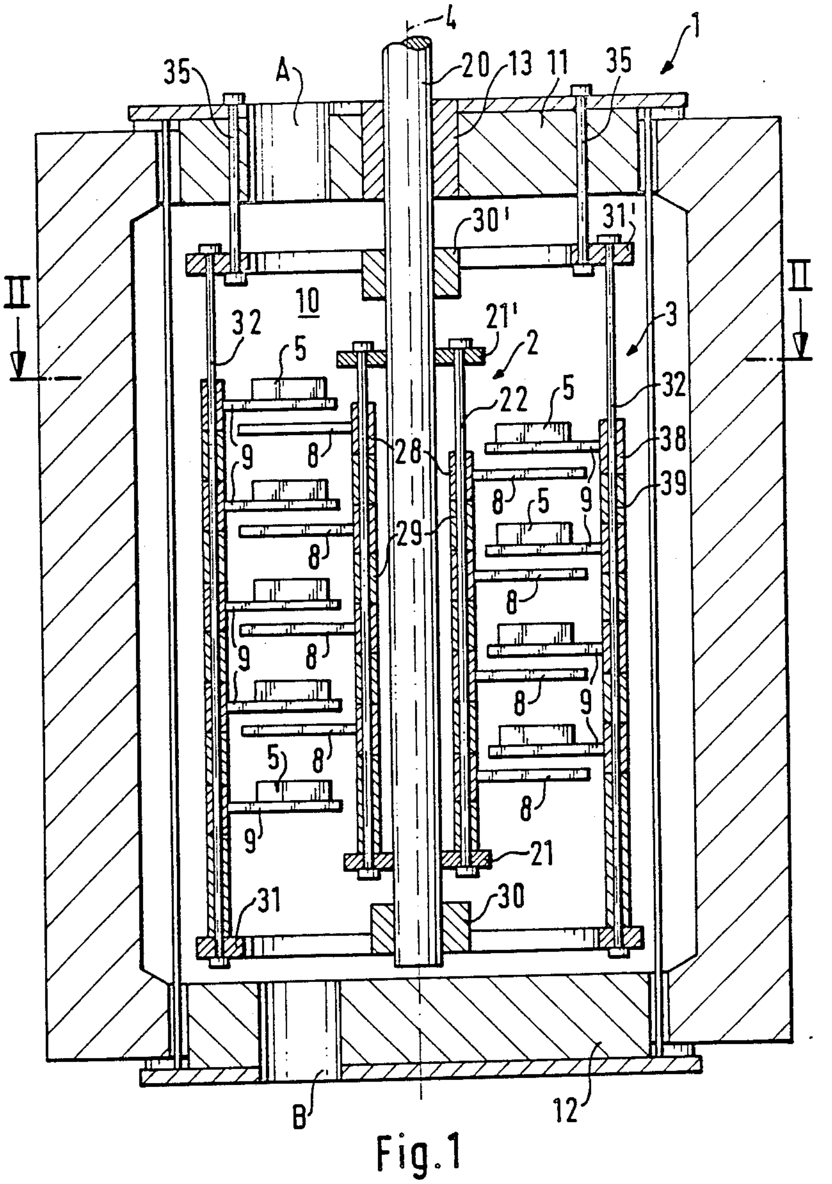
FIG. 1 is a vertical section along the central axis of the furnace with a schematic representation of an embodiment of two support arrangements for moving work pieces along a helical conveyor system.

Referring first to FIG. 1, the drawing shows a furnace 1 for the heat treatment of work pieces 5 with two support and mounting arrangements 2 and 3 around a vertical central axis 4. Said two support arrangements 2 and 3 are employed for moving the pieces 5 shown schematically in FIG. 1 from the top to the bottom of a furnace chamber 10 along a helical conveyor system substantially concentric with said axis 4, the center of the transport path of said conveyor system being helical and presented by the dot-dash circle 6 in FIG. 2. In the embodiment of the present invention shown in FIG. 1, said furnace 1 is charged through opening A in cover 11; said charge leaves said furnace through opening B in the bottom 12 of said furnace 1.

The first mounting arrangement 2 comprises a support shaft 20 coaxial with the vertical central axis 4, two flanges 21 and 21′ firmly connected with said support shaft 20 at a certain vertical distance from each other, pairs of vertical support bars 22 held by said flanges 21 and 21′ and mounted around central axis 4 at approximately even angle spacings, and fork-shaped support elements 8 attached to said pairs of support bars 22. Spacers 29 taking the form of twin-tubes are attached to said pairs of support bars 23 between footings 28 of the fork-shaped support elements 8, the vertical dimensions of said footings 28 and the spacers 29 between said footings determing the equal distances between each two successive fork-shaped support elements 8. The footings 28 and the spacers 29 on the pair of support bars 22 are in contact with each other through the influence of gravity and are supported by flange 21 attached firmly to support shaft 20, an upper restrain for the support elements 8 mounted on a pair of support bars 22 being unnecessary.

The second mounting means 3 comprises a lower sleeve 30 and an upper sleeve 30′ said sleeves being guided axially by support shaft 20 and being rotatable about said support shaft 20. A lower ring 31 and an upper ring 31′ are firmly connected with sleeves 30 and 31′. In the embodiment of the present invention depicted by FIG. 1, each such ring is shaped in the form of a wheel, the sleeve being the hub of said wheel and being connected with the outer circle of said wheel by means of spoke-type radial bars. Sleeves 30 and 30′ have a certain axial distance from neighbouring flanges 21 and 21′ said axial distances being sufficiently large for the two mounting means 2 and 3 to move in the direction of central axis 4 for conveying the work pieces 5 during operation.

The second mounting means 3 further comprises pairs of support bars 32 with parallel axes mounted with even angular spacing and an appropriate spatial relationship with the inner mounting means 2 between rings 31 and 31′. The support elements 9 associated with said second mounting means 3 which are also fork-shaped are attached to said pairs of support bars 32 in the same manner as described for the first mounting means 2, the vertical distance between two adjacent support elements 9 again being determined by the vertical dimensions of the footings 38 of said support elements 9 and the spacers 39 mounted on said pairs of bars 32.

In the embodiment of the present invention depicted by FIG. 1, the entire second mounting means 3 is suspended from cover 11 by means of anchor 35 provided above the upper ring 31′. As described herein above, said second mounting means 3 is radially centered relative to the first mounting means 2 by sleeves 30 and 30′ sliding on support shaft 20. Said second mounting means 3 and the associated support elements 9 remain stationary during operation, the relative movements of support elements 8 and 9 in the vertical direction and in the circumferential direction of the conveyor system necessary for conveying the work pieces 5 being affected by an appropriate movement of support shaft 20 serving as an actuator, said support shaft 20 being driven by drive means for lifting and lowering and for rotation not depicted in FIG. 1. Said support shaft 20 penetrates cover 11 through an appropriately sealed opening 13.

Figure 2:
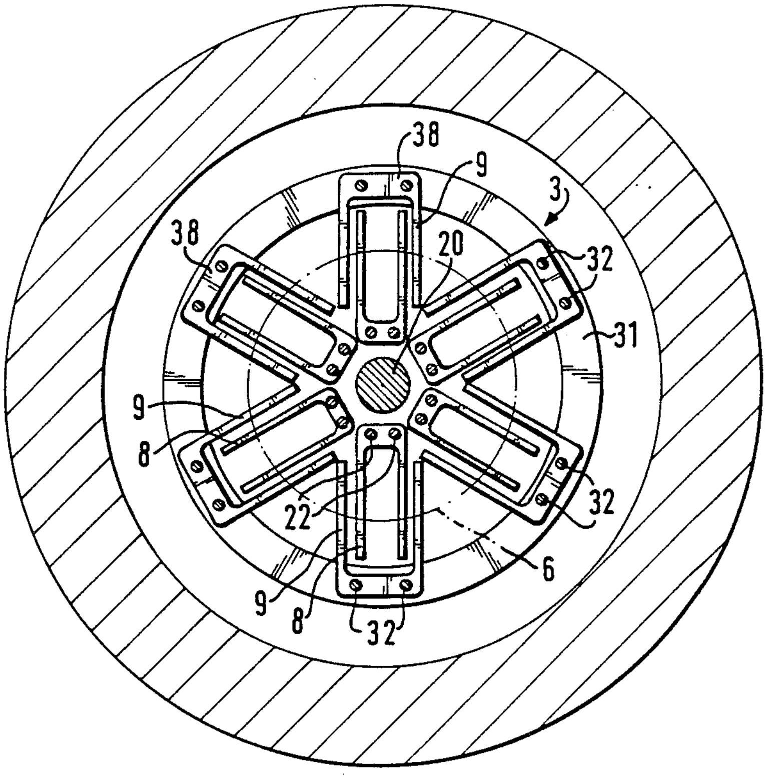
FIG. 2 is a schematic radial section along the II—II line of FIG. 1.

FIG. 2 shows the inner and the outer support elements 8 and 9 and the relative positions of said interacting elements. The two rod-type arms of the fork-shaped support elements 9 of the second mounting means 3 project substantially radially inward and have a larger distance from each other than the two arms of the fork-shaped support elements 8 of the first mounting means 2 projecting substantially radially outward. In view of the aforedescribed relative positions of support elements 8 and 9 the first mounting means 2 may be lifted or lowered relative to the stationary second mounting means 3 by the action of the support shaft 20 to lift a work piece 5 from support element 9 or deposit a work piece 5 on support element 9, the axial lift being predetermined so that after the completion of the lifting or lowering operation, support elements 8 projection radially outward may be rotated to the next succeeding position by rotation above or below support elements 9.

In the embodiment of the present invention depicted in FIG. 2, six support elements 8 and six support elements 9 are provided at an angular spacing of 60°; each rotation of the inner support arrangement 2 moving, for example, a work piece 5 from a stationary support element 9 to the adjacent support element 9 enclosing an angle of 60°. Following the deposition of said work piece 5 on said adjacent outer support element 9, mounting means 2 is lowered sufficiently for the associated support elements 8 to be turned in the opposite direction below the outer support elements 9 (in the embodiment of the present invention depicted in FIG. 2, a continuous rotation in one direction is impossible because of the helical shape of path 6, the vertical movement only representing one step from one outer support element 9 to the next outer support element 9). As shown clearly by FIG. 2, the fork-shaped support elements 8 and 9 are mounted to the vertical pairs of support bars 22 and 32 in a non-rotatable manner. As support shaft 20 serving as an actuator and rings 30 and 31′ are centered accurately, mounting means 2 and 3 are also centered accurately relative to each other and the fork-shaped support elements 8 and 9 may be positioned and moved with respect to each other with relatively small clearances.

Each fork-shaped support element may be of heat-resistant steel casting or may be welded or may be made of ceramic material.

It is contemplated that may changes and modifications may be made, by one of ordinary skill in the art, to the materials and arrangements of elements of the present invention without departing from the spirit and scope of the invention.

I claim:

1. A furnace for the the heat treatment of work pieces, comprising:

a heat treatment chamber defined by several furnace walls and having a central vertical axis;

conveyor means having workpiece support elements substantially arranged concentrically with respect to said vertical axis for moving said work pieces along a transport path inside said heat treatment chamber, said transport path extending concentrically relative to and at a distance from said vertical axis;

said conveyor means comprising first mounting means for supporting a first group of said support elements and second mounting means for supporting a second group of said support elements;

means interconnecting said first and second mounting means, together with the associated first and second groups of support elements, for relative movement with respect to each other both in a substantially vertical direction parallel to said vertical axis and in a substantially circular direction concentric relative to said vertical axis and further for providing said moving of said work pieces along said transport path concentric with respect to said vertical axis;

said means interconnecting including a vertical support shaft extending through at least one of said furnace walls coaxial with said vertical axis; and said means interconnecting having at least one hub-like sleeve firmly connected with said second mounting means, bearing means mounting said sleeve on said support shaft for relative rotary and vertical movements of said support shaft and said sleeve and for guiding each other on said axis.

2. A furnace according to claim 1, wherein said first mounting means further comprises two flanges fixedly mounted in vertically spaced positions on said support shaft; and first support bars with substantially parallel axes being mounted between said flanges and carrying said first group of support elements with said support elements projecting substantially radially outward from said support bars.

3. A furnace according to claim 2, wherein said second mounting means further comprises at least one ring mounted to said sleeve in a coaxially spaced relation to said axis, said support elements of said second group being connected with said at least one ring and arranged in a substantially uniform angular distribution with respect to said axis and projecting substantially radially inward.

4. A furnace according to claim 3, wherein said second mounting means further comprises a second sleeve vertically spaced with respect to said first mentioned sleeve on said support shaft, second bearing means mounting said second sleeve rotatable around and axially mobile along said support shaft, a second ring being firmly connected with said second sleeve, said rings being axially aligned with respect to each other, second support bars with parallel axes being mounted between said rings, said support elements of said second group of support elements being nonrotatably attached to said second support bars.

5. A furnace according to claim 4, wherein said two flange means are arranged axially between said two sleeves of said second mounting means, means separating said two sleeves axially from said two flange means by a distance for the axial movement of said sleeves of said second mounting means interconnected by said rings and said second support bars relative to said flange means of said first mounting means.

6. A furnace according to claim 5, wherein one of said furnace walls is a furnace cover and said second mounting means is suspended from said cover in said heat treatment chamber, and said second mounting means being connected to said cover by means of anchors.

7. A furnace according to claim 6, wherein said second mounting means is stationarily held in place inside said furnace, and including driving means for moving said support shaft in the axial direction and rotating said support shaft for relative movement between said first and said second mounting means.

8. A furnace according to claim 2, wherein each of said first group of said support elements comprises a footing element attached to at least one of said first support bars.

9. A furnace according to claim 8, wherein several of said first group of said support elements are attached to at least one of said first support bars spacer means for vertically spacing said several support elements relative to each other and said spacer means is attached to said at least one support bar.

10. A furnace according to claim 9, wherein said spacer means is tubular.

11. A furnace according to claim 9, wherein each of said first group of said support elements is attached to a pair of said first bars and said spacer means are of a twin-tube shape.

12. A furnace according to claim 9, wherein said support elements are fork-shaped.

13. A furnace according to claim 12, wherein said second support elements are fork-shaped having arms projecting radially inward, wherein said support elements of said first group of support elements project radially outward, said fork-shaped support elements of said second group of support elements being spaced relative to each other so as to allow said support elements of said first group of support elements to penetrate between said arms without being in contact with said arms.

14. A furnace according to claim 8 wherein said support elements and said associated footing means are made of ceramic material.

15. A furnace according to claim 8 wherein each of said support element and the associated footing means is a heat-resistant steel casting.

16. A furnace according to claim 1, wherein said second mounting means stationarily support said second group of said support elements generally concentrically outside of said first group of support elements;

said first mounting means carrying said first group of said support elements on said support shaft for rotation and axial movement with said support shaft, and in an array that is concentrically within said second group of said support element;

said first mounting means supporting said first group of said support elements in a helical array;

said second mounting means supporting said second group of support elements in a helical array corresponding to the helical array of said first mounting means; and means for driving said support shaft axially and rotatably to axially move said first group of said support elements upwardly to correspondingly lift workpieces from associated ones of said second group of said support elements, thereafter rotate an amount at least equal to the peripheral spacing of the support elements of each array and axially lower workpieces supported on said first group of said support elements downwardly to rest upon and be supported by said second group of said support elements, respectively, for helically conveying the workpieces within the furnace.

17. A furnace according to claim 16, wherein said first and second mounting means, first and second group of said support elements, said means interconnecting, and said support shaft are operatively connected only to each other to form said conveyor means as a unit independently of said furnace walls as a complete operative subassembly; and separate means for stationarily securing said second mounting means to said furnace walls.

18. A furnace for the heat treatment of work pieces, comprising:

a heat treatment chamber defined by several furnace walls and having a central vertical axis;

conveyor means having a first group of work piece support elements substantially arranged in a first generally helical array concentric with said vertical axis and a second group of support elements arranged concentrically outside said first group, said first and second groups together defining a helical transport path inside said heat treatment chamber extending concentrically relative to and radially spaced from said vertical axis;

means for moving one of said first and second groups axially and rotatably relative to the other of said first and second groups for lifting work pieces from the support elements of the other group onto the support elements of the one group, rotating and lowering the lifting work pieces onto respectively adjacent support elements of the other group;

means for holding the other of said groups stationary within said heat treatment chamber;

one of said mounting means including axially spaced apart annular members, axially extending support bars respectively mounted at opposite ends on said annular members, axially movable tubular mountings between each of said first group of support elements and said support bars, and tubular spacers between axially adjacent ones of said first group of support elements for determining the axial spacing of the support elements from each other to adjust the furnace for different height work pieces.

19. A furnace according to claim 18, including a second set of support bars respectively paired with said first mentioned support bars, each of said support elements having a pair of said tubular mountings respectively mounted on a pair of said support bars and said spacers further being mounted on said second set of support bars axially between axially adjacent support elements.

20. A furnace according to claim 19, wherein said bars are equally peripherally spaced from each other.

21. A furnace according to claim 18, wherein said pairs of bars are equally peripherally spaced from each other.

22. A furnace for heating workpieces, comprising:

a furnace chamber having a vertical central axis;

means for charging and discharging workpieces to and from said furnace chamber;

conveyor means arranged substantially concentrically with respect to said axis;

said conveyor means comprising a first group of workpiece support elements and a second group of workpiece support elements arranged helically about said axis for conveying the workpieces within at least a portion of said furnace chamber from said charging means to said discharging means;

inner mounting means extending between top and bottom portions of said furnace chamber and outer mounting means extending between top and bottom portions of said furnace chamber;

said support elements of said first group being mounted on said inner mounting means along the inner portion of said conveyor means and projecting substantially radially outwardly toward said outer mounting means, and said support elements of said second group being mounted to said outer mounting means along the outer portion of said conveyor means and projecting substantially radially inwardly toward said inner mounting means.

said inner mounting means and said first group of support elements being movable relative to said outer mounting means and said second group of support elements in substantially vertical directions parallel to said axis and in substantially circular directions concentric to said axis such that said relative movement provides step-wise travel of the workpieces in a helical direction of travel concentric with said axis, the workpieces being supported alternatively by said first and said second group of support elements at alternating points of engagement;

shaft means extending into said furnace chamber coaxially with said central axis for being driven externally of said furnace chamber axially and rotationally;

one of said mounting means being drivingly and fixedly connected on said shaft for axial and rotational movement with said shaft for conveying;

bearing means mounting the other of said mounting means on said shaft for axial and rotational relative movement for conveying, and for accurately locating said first and second groups of support elements relative to each other throughout the conveying; and means holding said other of said mounting means stationary.

23. A furnace for heating workpieces, comprising:

a furnace chamber having a vertical central axis;

means for charging and discharging workpieces to and from said furnace chamber;

conveyor means arranged substantially concentrically with respect to said axis;

said conveyor means comprising a first group of workpiece support elements and a second group of workpiece support elements arranged helically about said axis for conveying the workpieces within at least a portion of said furnace chamber from said charging means to said discharging means;

inner mounting means extending between top and bottom portions of said furnace chamber and outer mounting means extending between top and bottom portions of said furnace chamber;

said support elements of said first group being mounted on said inner mounting means along the inner portion of said conveyor means and projecting substantially radially outwardly toward said outer mounting means, and said support elements of said second group being mounted to said outer mounting means along the outer portion of said conveyor means and projecting substantially radially inwardly toward said inner mounting means;

said inner mounting means and said first group of support elements being movable relative to said outer mounting means and said second group of support elements in substantially vertical directions parallel to said axis and in substantially circular directions concentric to said axis such that said relative movement provides step-wise travel of the workpieces in a helical direction of travel concentric with said axis, the workpieces being supported alternatively by said first and said second group of support elements at alternating points of engagement;

shaft means extending into said furnace chamber coaxially with said central axis for being device externally of said furnace chamber axially and rotationally;

one of said mounting means being drivingly and fixedly connected on said shaft for axial and rotational movement with said shaft;

means holding the other of said mounting means stationary within said furnace chamber;

said one mounting means including a plurality of circumferentially arranged bars parallel to said axis and rigidly connected to said shaft, the support elements of said one mounting means being non-rotatably and telescopically mounted on respective one of said bars, with each bar having a plurality of vertically spaced support elements telescopically mounted on it; and spacer means telescopically mounted on said bars between vertically adjacent support elements for adjusting the vertical spacing between support elements to thereby accommodate different sized workpieces.

* * * * *